(12) United States Patent
Kono

(10) Patent No.: US 9,348,131 B2
(45) Date of Patent: May 24, 2016

(54) IMAGE ACQUISITION APPARATUS

(71) Applicant: OLYMPUS CORPORATION, Tokyo (JP)

(72) Inventor: Takayuki Kono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 502 days.

(21) Appl. No.: 13/862,775

(22) Filed: Apr. 15, 2013

(65) Prior Publication Data
US 2014/0009594 A1  Jan. 9, 2014

(30) Foreign Application Priority Data
Jul. 4, 2012 (JP) .................................. 2012-150537

(51) Int. Cl.
*G02B 21/36* (2006.01)
*H04N 5/349* (2011.01)
*H04N 5/225* (2006.01)

(52) U.S. Cl.
CPC ............ *G02B 21/361* (2013.01); *G02B 21/362* (2013.01); *G02B 21/367* (2013.01); *H04N 5/2258* (2013.01); *H04N 5/349* (2013.01); *H04N 5/2254* (2013.01)

(58) Field of Classification Search
CPC .. G02B 21/361; G02B 21/362; G02B 21/367; H04N 5/2254; H04N 5/2258; H04N 5/349
USPC ......................................................... 348/79
See application file for complete search history.

(56) References Cited

U.S. PATENT DOCUMENTS

| 4,143,938 A | 3/1979 | Feinbloom |
| 5,579,156 A * | 11/1996 | Faltermeier .......... G02B 21/361 348/64 |
| 2007/0075218 A1 | 4/2007 | Gates et al. |
| 2008/0037980 A1 * | 2/2008 | Okumura ............... G03B 17/02 396/535 |
| 2008/0239475 A1 | 10/2008 | Hirukawa et al. |

FOREIGN PATENT DOCUMENTS

| DE | 33 18 011 A1 | 11/1984 |
| JP | H06-233060 A | 8/1994 |
| JP | H09-186917 A | 7/1997 |
| JP | 2004-282551 A | 10/2004 |

OTHER PUBLICATIONS

Extended European Search Report received Jun. 26, 2013 in corresponding Application No./Patent No. 13002082.9-1562.

* cited by examiner

*Primary Examiner* — Anner Holder
(74) *Attorney, Agent, or Firm* — Scully, Scott, Murphy & Presser, P.C.

(57) ABSTRACT

High-definition images are acquired at low cost while achieving a reduction in apparatus size and a reduction in the incident light level. Provided is an image acquisition apparatus that includes a light-path setting member for making incident light enter two or more light paths; two or more different-characteristics imaging devices that acquire images of light entering the light paths set by the light-path setting member; and a moving part to which at least one of the two or more imaging devices is attached and that minutely moves the imaging device in a direction perpendicular to an optical axis.

9 Claims, 4 Drawing Sheets

IMAGE ACQUISITION APPARATUS

CROSS-REFERENCE TO RELATED APPLICATIONS

This application is based on Japanese Patent Application No. 2012-150537, the contents of which are incorporated herein by reference.

BACKGROUND OF THE INVENTION

1. Field of the Invention

The present invention relates to an image acquisition apparatus.

2. Description of Related Art

There are known conventional image acquisition apparatuss in which two imaging devices are included, and light collected by an objective lens is split to be guided to the imaging devices via different optical elements, thereby acquiring two images having different characteristics at the same time (for example, see Japanese Unexamined Patent Application, Publication No. Hei 09-186917).

With an image acquisition apparatus disclosed in Japanese Unexamined Patent Application, Publication No. Hei 09-186917, in order to acquire high-definition images, it is necessary to adopt a large imaging device with higher resolution or an imaging device with a small pixel pitch.

BRIEF SUMMARY OF THE INVENTION

According to one aspect, the present invention provides an image acquisition apparatus including: a light-path setting member for making incident light enter two or more light paths; two or more different-characteristics imaging devices that acquire images of light entering the light paths set by the light-path setting member; and a moving part to which at least one of the two or more imaging devices is attached and that minutely moves the imaging device in a direction perpendicular to an optical axis.

DETAILED DESCRIPTION OF THE INVENTION

An image acquisition apparatus 1 according to an embodiment of the present invention will be described below with reference to the drawings.

The image acquisition apparatus 1 of this embodiment is used for a microscope (observation apparatus) 2.

Figure 1:
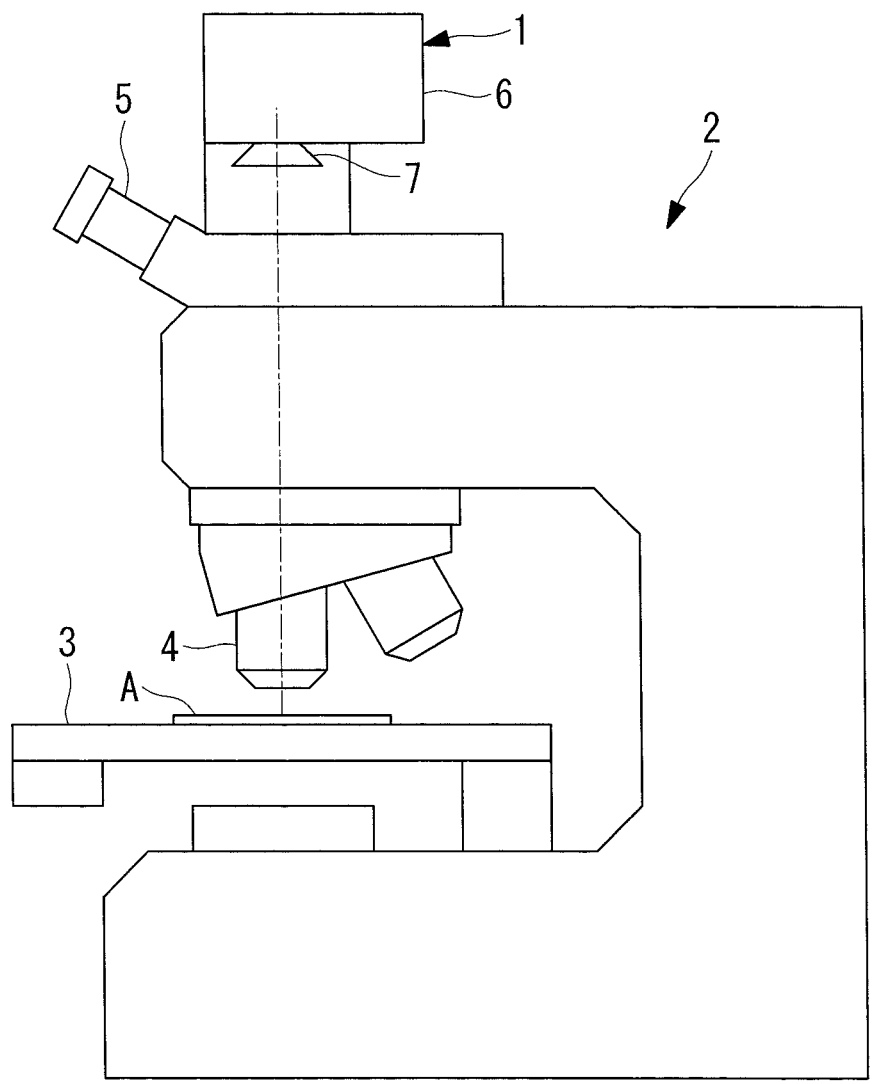
FIG. 1 is a diagram showing the overall configuration of a microscope on which an image acquisition apparatus according to an embodiment of the present invention is mounted.

As shown in FIG. 1, the microscope 2 includes a stage 3 on which a specimen A is positionally placed and that is provided so as to be movable in the vertical direction, an objective lens 4 that enlarges an image of the specimen A placed on the stage 3, an imaging lens (not shown), and an eyepiece 5 used for visual observation.

Figure 2:
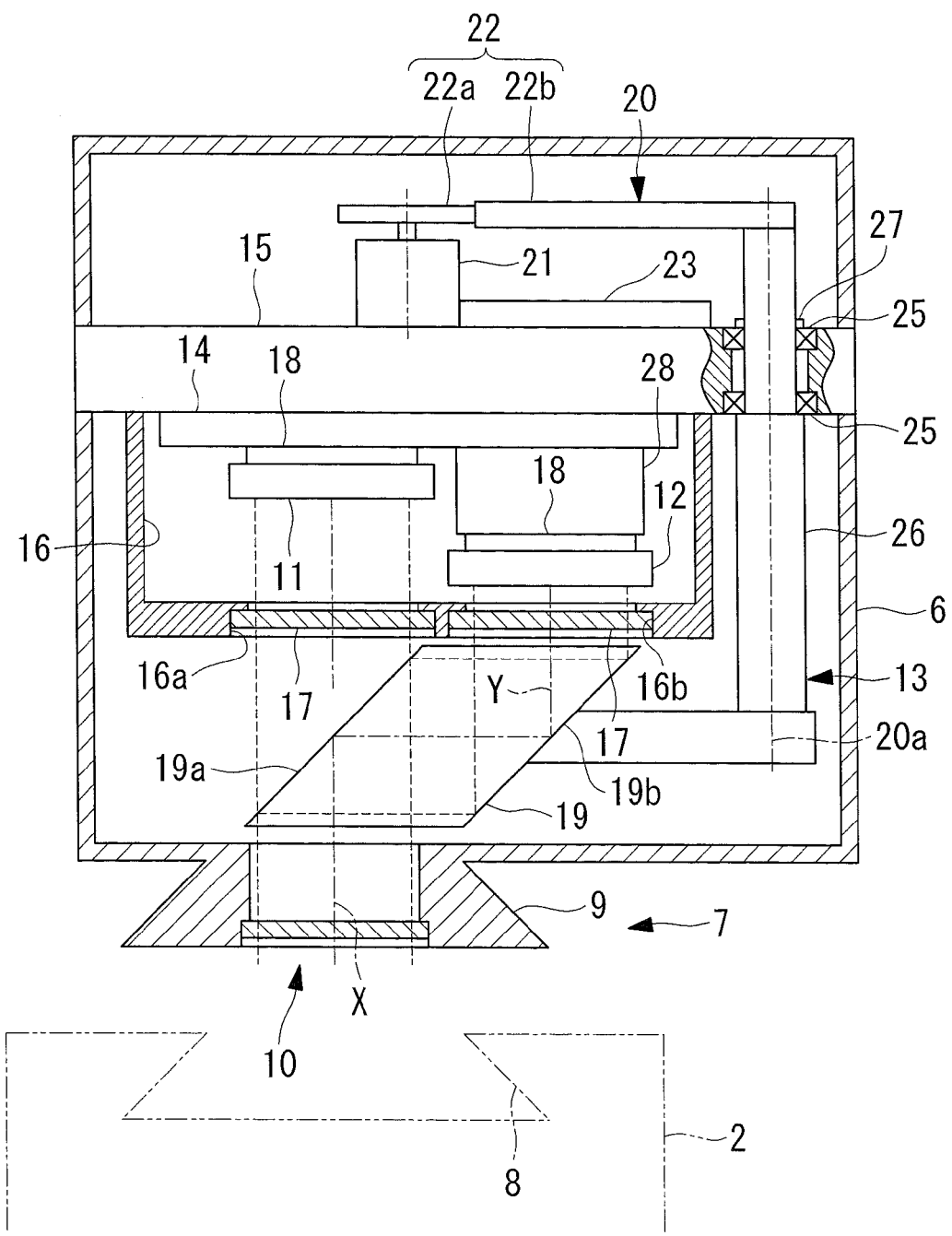
FIG. 2 is a longitudinal sectional view showing the image acquisition apparatus according to this embodiment to be mounted on the microscope shown in FIG. 1.

As shown in FIG. 1, the image acquisition apparatus 1 of this embodiment includes a chassis 6 and a connecting part 7 used to detachably attach the chassis 6 to the microscope 2. As shown in FIG. 2, for example, the connecting part 7 is provided with a dovetail 9 to be engaged with a dovetail groove 8 provided in the microscope 2. The connecting part 7 is not limited to the dovetail 9 and the dovetail groove 8, and another desired connecting method can be adopted.

Furthermore, the image acquisition apparatus 1 of this embodiment includes an opening 10 that is provided in the connecting part 7 and that allows light from the specimen A collected by the microscope 2 to enter the chassis 6, two imaging devices 11 and 12 for imaging light that has entered along an entrance optical axis X via the opening 10, a light-path switching part 13 for switching between light paths from the opening 10 to the imaging devices 11 and 12, and a moving part 14 for minutely moving the imaging device 11 in a direction perpendicular to an optical axis 11a (see FIG. 6A) of the imaging device 11.

The two imaging devices 11 and 12 are, for example, a color CCD (hereinafter, also referred to as color CCD 11) having excellent color reproducibility and a monochrome CCD (hereinafter, also referred to as monochrome CCD 12) having higher sensitivity than the color CCD 11.

In a state in which the moving part 14, to be described later, is stopped, the color CCD 11 is disposed such that the optical axis 11a, which is perpendicular to its imaging surface, is aligned with the entrance optical axis X of the opening 10, which is provided in the connecting part 7. Furthermore, the monochrome CCD 12 has an optical axis 12a (see FIG. 6B) that is perpendicular to its imaging surface and that is located parallel to the optical axis 11a of the color CCD 11 with a gap interposed therebetween.

The imaging devices 11 and 12 are disposed in a sealed chamber (accommodating section) 16 that is fixed to an intermediate plate 15 in the chassis 6. The sealed chamber 16 is provided with openings 16a and 16b at two positions, and the openings 16a and 16b are each sealed with a dust glass 17. Furthermore, a gap between the sealed chamber 16 and the intermediate plate 15 is sealed with a sealing member (not shown) so as to be air-sealed. Furthermore, a dehumidification part (not shown) for maintaining the sealed chamber 16 at low humidity may be provided in the sealed chamber 16.

Heat-transfer elements 18 for dissipating heat generated from the imaging devices 11 and 12 are disposed on back surfaces of the imaging devices 11 and 12. The heat-transfer elements 18 are, for example, Peltier elements, and are also used as structural members for fixing the imaging devices 11 and 12 to the moving part 14, to be described later.

The light-path switching part 13 includes a prism (light-path setting member) 19 and a swivel mechanism 20 that supports the prism 19 in a manner allowing it to swivel about a swivel axis 20a that is parallel to the optical axes 11a and 12a of the color CCD 11 and the monochrome CCD 12.

The prism 19 has a parallelepiped shape having two reflecting surfaces 19a and 19b disposed in parallel with a gap interposed therebetween.

The prism 19 is moved by the swivel mechanism 20 between a position on the entrance optical axis X of a light beam entering from the opening 10 and a position shifted from the entrance optical axis X. When the reflecting surface 19a is disposed on the entrance optical axis X of a light beam entering from the opening 10, specifically, on the optical axis 11a of the color CCD 11, the optical axis 11a being aligned with the entrance optical axis X, the prism 19 is disposed at 45 degrees with respect to the optical axis 11a.

Thus, a light beam entering via the opening 10 is deflected by 90 degrees by the reflecting surface 19a and is then incident on the reflecting surface 19b. Because the two reflecting surfaces 19a and 19b are disposed in parallel with the gap interposed therebetween, the reflecting surface 19b is disposed at 45 degrees with respect to the optical axis of the light beam that has been deflected by the reflecting surface 19a.

Specifically, in the prism 19, the light beam deflected by 90 degrees by the reflecting surface 19a is again deflected by 90 degrees by the reflecting surface 19b. The light beam entering the prism 19 is deflected twice, each time by 90 degrees, thus being deflected in a crank-like manner by the prism 19 and exiting along an exit optical axis Y that is accurately parallel to the entrance optical axis X.

On the other hand, when the prism 19 is removed from the entrance optical axis X by the swivel mechanism 20, the light beam entering via the opening 10 directly enters the color CCD 11 without passing through the prism 19.

Figure 3:
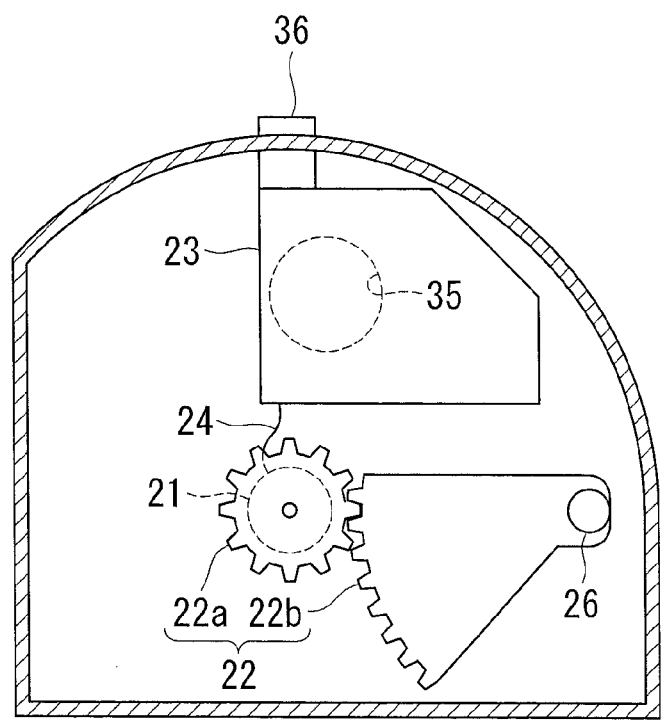
FIG. 3 is a transverse sectional view, cutting through a chassis, showing a swivel mechanism disposed in a space above an intermediate plate in the image acquisition apparatus shown in FIG. 2.

The swivel mechanism 20 includes a stepping motor 21, a transfer mechanism 22 that transfers a torque of the stepping motor 21 to the prism 19, and a control section 23 that controls the stepping motor 21. The control section 23 stores data used to make the prism 19 swivel up to a set angular position and controls the stepping motor 21 based on the stored data. Reference numeral 24 (see FIG. 3) denotes a cable connecting the stepping motor 21 and the control section 23.

The transfer mechanism 22 includes a first gear 22a that is provided on the stepping motor 21; a shaft 26 that is supported through the intermediate plate 15 in the chassis 6 by means of a bearing 25 so as to be able to swivel about the swivel axis 20a and to one end of which the prism 19 is fixed; and a second gear 22b that is fixed to the shaft 26 and that engages with the first gear 22a. The torque of the stepping motor 21 is transferred to the shaft 26 via the first gear 22a and the second gear 22b. When the shaft 26 is rotated about the swivel axis 20a, the prism 19 fixed to the end of the shaft 26 is swiveled by a predetermined angle. In the figure, reference numeral 27 denotes a nut that applies precompression on the bearing 25.

Figures 6A, 6B:
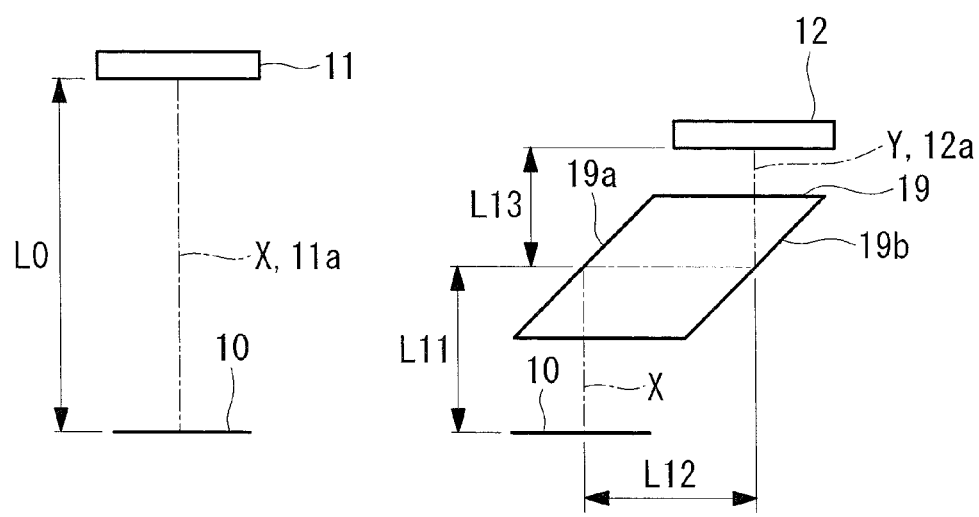
FIG. 6A is a view for explaining an optical path length up to a color CCD provided in the image acquisition apparatus shown in FIG. 2.
FIG. 6B is a view for explaining an optical path length up to a monochrome CCD provided in the image acquisition apparatus shown in FIG. 2.

As shown in FIG. 6B, according to the design, a distance L12 between the entrance optical axis X and the exit optical axis Y of the prism 19 corresponds to the distance between the optical axes 11a and 12a of the color CCD 11 and the monochrome CCD 12. Furthermore, the distance from the opening 10 to the imaging surface of the color CCD 11 is represented by L0, as shown in FIG. 6A, and the distance from the opening 10 to the reflecting surface 19a is represented by L11, and the distance from the reflecting surface 19b to the imaging surface of the monochrome CCD 12 is represented by L13, as shown in FIG. 6B.

In this case, in order to prevent light entering the chassis 6 via the opening 10 from being out of focus on both the imaging surfaces of the imaging devices 11 and 12, the following equation needs to be satisfied in terms of air-equivalent lengths.

$$L0 = L11 + L12 + L13 \quad (1)$$

Thus, for the optical path length of the monochrome CCD 12 shown in FIG. 6B, whose actual dimension is increased due to the intervening prism 19, a gap member 28 is disposed between the heat-transfer element 18 and the moving part 14 in order to compensate for the increase in the air-equivalent length due to the prism 19.

Figure 5:
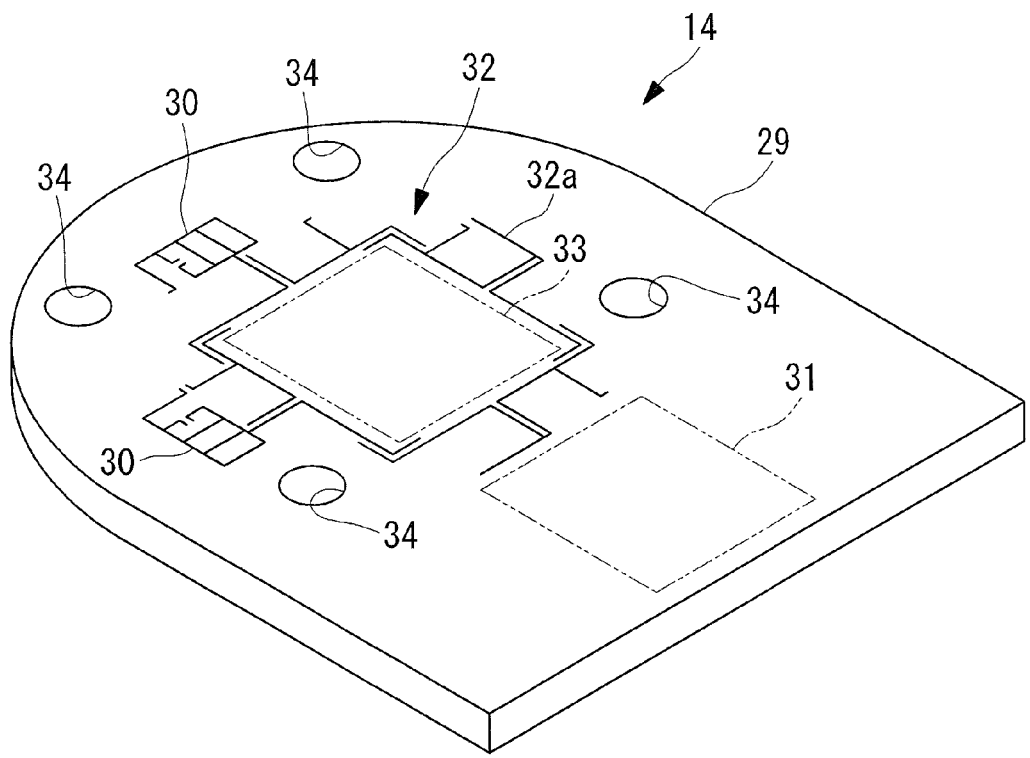
FIG. 5 is a perspective view for explaining a moving part on which the two imaging devices provided in the image acquisition apparatus shown in FIG. 2 are to be fixed.

As shown in FIG. 5, the moving part 14 is configured by embedding piezo elements 30 in the metal flat plate 29. The metal flat plate 29 is provided with a fixed part 31 that is fixed to the intermediate plate 15 in the chassis 6, a plurality of hinge parts 32 that are structured by forming, in the metal flat plate 29, a plurality of grooves 32a that penetrate the metal flat plate 29 in the plate-thickness direction by a wire-cutting processing method, for example, and a movable part 33 that is provided so as to be movable with respect to the fixed part 31 in a direction perpendicular to the plate-thickness direction by deforming the hinge parts 32. In the figure, reference numeral 34 denotes through-holes used to fix the moving part 14 to the intermediate plate 15 with screws (not shown).

In the example shown in FIG. 2, the color CCD 11 is fixed to the movable part 33 via the heat-transfer element 18, and the monochrome CCD 12 is fixed to the fixed part 31 via the gap member 28 and the heat-transfer element 18.

The piezo elements 30 are embedded at two positions so as to displace the movable part 33 with respect to the fixed part 31 in two directions perpendicular to the plate thickness of the metal flat plate 29. By combining the displacements of the hinge parts 32 caused by the displacements of the two piezo elements 30, the movable part 33 can be minutely moved two-dimensionally with respect to the fixed part 31.

The piezo elements 30 are connected to cables (not shown), and the cables are connected to the control section 23 via a through-hole 35 (see FIG. 3) provided in the intermediate plate 15. The control section 23 outputs AC (alternate current) signals to the piezo elements 30 via the cables to make the piezo elements 30 elongate or contract, thereby allowing the movable part 33 to minutely reciprocate two-dimensionally in two directions perpendicular to the plate thickness of the metal flat plate 29.

The piezo elements 30 displace the movable part 33 with, for example, an amplitude of half the pixel pitch of the color CCD 11 in both row and column directions of the pixel array.

In the figure, reference numeral 36 (see FIG. 3) denotes a connector used to connect the control section 23 to an external computer.

The operation of the thus-configured image acquisition apparatus 1 of this embodiment will be described below.

In order to acquire an image of light from the specimen A collected by the microscope 2, by using the image acquisition apparatus 1 of this embodiment, first, the specimen A is placed on the stage 3 of the microscope 2, and the stage 3 is vertically moved to locate the specimen A at a focal position of the objective lens 4. Thus, an enlarged image of the specimen A formed by the objective lens 4, the imaging lens, and the eyepiece 5 can be observed.

Then, to observe the image of the specimen A with the image acquisition apparatus 1, the light path is switched by a light-path switching mechanism (not shown) from the eyepiece 5 to the image acquisition apparatus 1 side. Thus, a light beam from the specimen A enters the image acquisition apparatus 1 via the opening 10.

Figure 4:
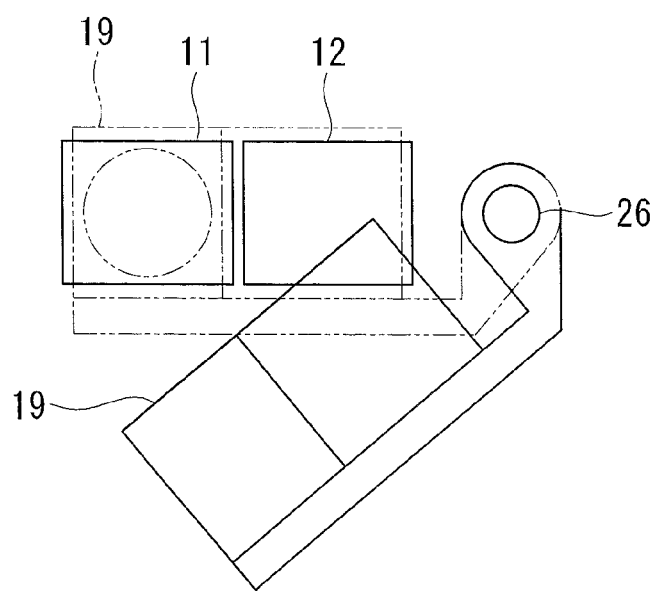
FIG. 4 is a view showing a prism and imaging devices disposed in a space below the intermediate plate in the image acquisition apparatus shown in FIG. 2.

To observe the specimen A with the color CCD 11 at low resolution, the computer connected to the connector 36 is operated to actuate the stepping motor 21 via the control section 23 to make the prism 19 swivel up to a position indicated by a solid line in FIG. 4 via the transfer mechanism 22. Because the prism 19 is thus removed from the light path between the opening 10 and the color CCD 11, a light beam entering the chassis 6 via the opening 10 is directly imaged by the color CCD 11 without passing through the prism 19.

In this state, while keeping the movable part 33 stationary without actuating the moving part 14, the control section 23 activates the color CCD 11 to acquire an image of the specimen A. Thus, the image of the specimen A can be acquired with the number of pixels possessed by the color CCD 11.

At this time, the color CCD 11 is cooled by driving the heat-transfer element 18. Heat generated in the heat-transfer element 18 is dissipated to the outside via the metal flat plate 29 constituting the moving part 14, the intermediate plate 15, and the chassis 6.

Next, to observe the specimen A with the color CCD 11 at high resolution, the computer connected to the connector 36 is operated to actuate the moving part 14 via the control section 23. With the moving part 14, the color CCD 11 disposed on the movable part 33 is displaced in a direction perpendicular to the optical axis 11a. The color CCD 11 is displaced by the moving part 14 by half the pixel pitch of the color CCD 11, for example, thereby making it possible to array pixels between the pixels of the color CCD 11 to configure a pseudo color CCD 11 in which a large number of pixels are arrayed with a short pixel pitch, thus acquiring a high-resolution image.

Here, a similar resolution can also be obtained by actually employing a color CCD 11 in which a large number of pixels are arrayed with a short pitch; however, in that case, the level of light incident on each pixel is reduced, thus making it difficult to acquire a bright image. According to this embodiment, an advantage is afforded in that a high-resolution image can be acquired without reducing the image brightness.

Furthermore, because only the dust glass 17 is disposed in the light path between the color CCD 11 and the opening 10, and substantially only air exists therein, there is another advantage that chromatic aberration is not caused, thus making it possible to acquire an image having high color-reproducibility.

Furthermore, because the moving part 14 moves the color CCD 11 in a direction perpendicular to the optical axis, a positional shift (decentering) of the image of the specimen A entering the color CCD 11 may be corrected.

On the other hand, to observe the specimen A with the monochrome CCD 12 at high sensitivity, the computer is operated to actuate the stepping motor 21 via the control section 23 to make the prism 19 swivel up to a position indicated by a chain line in FIG. 4 via the transfer mechanism 22. Because the prism 19 is thus inserted between the opening 10 and the color CCD 11, a light beam entering the chassis 6 via the opening 10 is reflected by the two reflecting surfaces 19a and 19b of the prism 19 and is then imaged by the monochrome CCD 12.

The monochrome CCD 12 is also cooled by driving the heat-transfer element 18. Heat generated in the heat-transfer element 18 is dissipated to the outside via the gap member 28, the metal flat plate 29 constituting the moving part 14, the intermediate plate 15, and the chassis 6.

In this case, the two reflecting surfaces 19a and 19b are provided parallel to each other. Thus, even if the swivelling accuracy of the swivel mechanism 20 or the positioning accuracy of the prism 19 is low, a light beam entering from the opening 10 along the entrance optical axis X is reflected twice, enters the monochrome CCD 12 with accuracy along the optical axis 12a of the monochrome CCD 12, and is imaged by the monochrome CCD 12, without rotating the observed image.

Furthermore, because the space in the chassis 6 where the optical systems are disposed is isolated by the intermediate plate 15 from the space where the stepping motor 21 and the transfer mechanism 22 are disposed, dust generated at the transfer mechanism 22 etc. does not obscure observation light. Therefore, a sharp image can be acquired by preventing dust from getting in the observed image. Furthermore, because the imaging devices 11 and 12 are disposed in the sealed chamber 16, entry of moisture-containing outside air is prevented, thus preventing the occurrence of condensation.

In this way, according to the image acquisition apparatus 1 of this embodiment, in order to acquire high-resolution images, it is not necessary to adopt an imaging device with a small pixel pitch or a large-scale imaging device with a large number of pixels. Thus, it is possible to acquire high-definition images at low cost while achieving a reduction in size and preventing a reduction in the incident light level.

Furthermore, according to the image acquisition apparatus 1 of this embodiment, the color CCD 11 minutely moved by the movable part 33 is disposed in the light path in which only the dust glass 17 exists between the opening 10 and the color CCD 11. Thus, there is also an advantage in that deterioration of an image of the specimen A is prevented, and a higher-definition image can be obtained.

Note that, in this embodiment, although the two imaging devices 11 and 12 are included, images having two types of resolution are acquired with the color CCD 11, and one type of image is acquired with the monochrome CCD 12, the number of imaging devices is not limited thereto, and it is also possible to switch among three or more imaging devices.

Alternatively, although the color CCD 11 and the monochrome CCD 12 are adopted as the imaging devices 11 and 12, instead of this, both imaging devices may be color CCDs 11 or monochrome CCDs 12. Furthermore, instead of CCDs, CMOS image sensors may be adopted.

Furthermore, instead of the dust glass 17, which is used to seal the sealed chamber 16, a filter that transmits light having a wavelength band suitable for observation may be adopted for each of the imaging devices 11 and 12.

Furthermore, in this embodiment, the two reflecting surfaces 19a and 19b are disposed at an angle of 45 degrees with respect to the optical axes 11a and 12a. Instead of this, the angle thereof can be desirably set so long as the two reflecting surfaces 19a and 19b are parallel to each other and are disposed neither parallel nor perpendicular to the optical axes 11a and 12a.

Furthermore, in this embodiment, although the prism 19 having the two reflecting surfaces 19a and 19b has been shown as an example, instead of this, two mirrors parallel to each other may be provided at the positions of the reflecting surfaces 19a and 19b.

Furthermore, instead of the mirrors, half mirrors or dichroic mirrors may be adopted. When half mirrors or dichroic mirrors are adopted, it is possible to switch between acquisition of a color image alone and simultaneous acquisition of a color image and a monochrome image, instead of alternatively switching between image acquisition with the color CCD 11 and image acquisition with the monochrome CCD 12.

Furthermore, instead of adopting the swivel mechanism 20, it is possible to adopt a configuration in which a half mirror or a dichroic mirror is fixed in the light path between the opening 10 and the color CCD 11, and a mirror disposed parallel to that mirror, and separated therefrom by a gap, is fixed on the optical axis 12a of the monochrome CCD 12. Thus, it is possible to acquire a color image and a monochrome image at the same time and to switch the resolution for the color image.

Furthermore, in this embodiment, the two imaging devices 11 and 12 are both fixed to the metal flat plate 29, which constitutes the moving part 14. Instead of this, it is possible to adopt a configuration in which the imaging device 11 is fixed to the movable part 33 provided on the metal flat plate 29, and the imaging device 12 is directly fixed to the intermediate plate 15 via the gap member 28 and the heat-transfer element 18.

The above-described embodiment leads to the following inventions.

According to one aspect, the present invention provides an image acquisition apparatus including: a light-path setting member for making incident light enter two or more light paths; two or more different-characteristics imaging devices that acquire images of light entering the light paths set by the light-path setting member; and a moving part to which at least one of the two or more imaging devices is attached and that minutely moves the imaging device in a direction perpendicular to an optical axis.

According to this aspect, the incident light is made to enter two or more light paths by the light-path setting member and is imaged by the different-characteristics imaging devices disposed in the light paths, thereby making it possible to observe an object in two or more different ways suitable for the observation method. In this case, the moving part is actuated to minutely move at least one imaging device attached to the moving part in a direction perpendicular to the optical axis, thereby increasing the pseudo number of pixels of the imaging device and acquiring a high-definition image. Because neither the size of the imaging device itself nor the number of pixels is increased, a high-definition image can be acquired at low cost while achieving a reduction in the apparatus size and a reduction in the incident light level.

In the above-described aspect, the imaging device that is disposed in the light path having the shortest geometric optical-path length, among the light paths, may be attached to the moving part.

By doing so, deterioration of information about the incident light until it reaches the imaging device is minimized, thus making it possible to acquire a higher-definition image.

Furthermore, in the above-described aspect, the light-path setting member may be provided in a manner capable of being inserted into and removed from a light path of the incident light.

By doing so, by inserting/removing the light-path setting member into/from the light path of the incident light, it is possible to switch the light path in which the incident light passes and to make all of the incident light enter the imaging device disposed in each of the light paths.

Furthermore, in the above-described aspect, the light-path setting member may be disposed in a light path of the incident light and may split the light path into two or more.

By doing so, with the two or more imaging devices disposed in the two or more light paths, two or more different-characteristics images of an identical object can be acquired at the same time.

Furthermore, in the above-described aspect, the light-path setting member may have two reflecting surfaces that are parallel to each other and that reflect the incident light.

By doing so, when the light-path setting member is inserted/removed into/from the light path of the incident light, two light paths to be switched can be set accurately parallel to each other. Furthermore, when the light-path setting member is disposed in the light path of the incident light to split the incident light, two light paths obtained after the splitting can be set accurately parallel to each other. Thus, two imaging devices to be disposed in the light paths can be arranged side-by-side, thus making it possible to construct the image acquisition apparatus compactly.

Furthermore, in the above-described aspect, the two or more imaging devices may have imaging surfaces located on different planes.

By doing so, the difference in the optical path length between two or more different light paths is compensated for, and incident light is converged on the imaging surfaces of the imaging devices, thus making it possible to acquire sharp images.

Furthermore, in the above-described aspect, a light path for at least one of the imaging devices may be aligned with a light path of the incident light.

By doing so, by making incident light enter at least one imaging device via the straight light path, deterioration of information about the incident light until it reaches the imaging device is minimized, thus making it possible to acquire a higher-definition image.

Furthermore, in the above-described aspect, an accommodating section in which the imaging devices are disposed in a space that is sealed in an air-sealed state may be further included.

By doing so, the occurrence of condensation in the imaging devices can be prevented.

What is claimed is:

1. An image acquisition apparatus comprising:
   a light-path setting member that is configured to make incident light enter one of two or more light paths;
   two or more imaging devices corresponding to the two or more light paths, the two or more imaging devices including a color imaging device and a monochrome imaging device that acquire an image of light entering the one of the two or more light paths set by the light-path setting member; and
   a moving part to which at least the color imaging device is attached and that, when a high-resolution color image is required, minutely moves the color imaging device in a direction perpendicular to an optical axis to configure a pseudo color imaging device in which additional pixels are arrayed between pixels of the color imaging device.

2. An image acquisition apparatus according to claim 1, wherein an imaging device of the two or more imaging devices that is disposed in the light path having a shortest geometric optical-path length, among the two or more light paths, is attached to the moving part.

3. An image acquisition apparatus according to claim 1, wherein the light-path setting member is provided in a manner capable of being inserted into and removed from one light path of the two or more light paths.

4. An image acquisition apparatus according to claim 1, wherein the light-path setting member is disposed in one light path of the two or more light paths and splits the one light path into the two or more light paths.

5. An image acquisition apparatus according to claim 1, wherein the light-path setting member has two reflecting surfaces that are parallel to each other and that reflect the incident light.

6. An image acquisition apparatus according to claim 5, wherein the two or more imaging devices have imaging surfaces located on different planes.

7. An image acquisition apparatus according to claim 1, wherein one light path of the two or more light paths for at least one of the imaging devices is aligned with a light path of the incident light.

8. An image acquisition apparatus according to claim 1, further comprising an accommodating section in which the two or more imaging devices are disposed in a space that is sealed in an air-sealed state.

9. An image acquisition apparatus according to claim 1, wherein the additional pixels are arrayed at a distance halfway between the pixels of the color imaging device.

* * * * *